(12) United States Patent
Jo et al.

(10) Patent No.: US 12,459,048 B2
(45) Date of Patent: Nov. 4, 2025

(54) OUTPUT CONTROL METHOD FOR GAS-SHIELDED ARC WELDING, WELDING SYSTEM, WELDING POWER SOURCE, AND WELDING CONTROL DEVICE

(71) Applicant: Kobe Steel, Ltd., Kobe (JP)

(72) Inventors: Baini Jo, Fujisawa (JP); Shogo Nakatsukasa, Fujisawa (JP); Takeshi Yano, Fujisawa (JP); Akira Ogawa, Fujisawa (JP); Eiji Sato, Fujisawa (JP)

(73) Assignee: Kobe Steel, Ltd., Kobe (JP)

( * ) Notice: Subject to any disclaimer, the term of this patent is extended or adjusted under 35 U.S.C. 154(b) by 740 days.

(21) Appl. No.: 17/792,044

(22) PCT Filed: Dec. 7, 2020

(86) PCT No.: PCT/JP2020/045554
§ 371 (c)(1),
(2) Date: Jul. 11, 2022

(87) PCT Pub. No.: WO2021/153011
PCT Pub. Date: Aug. 5, 2021

(65) Prior Publication Data
US 2023/0038418 A1 Feb. 9, 2023

(30) Foreign Application Priority Data
Jan. 29, 2020 (JP) .................. 2020-012535

(51) Int. Cl.
*B23K 9/095* (2006.01)
*B23K 9/16* (2006.01)

(52) U.S. Cl.
CPC ............ *B23K 9/095* (2013.01); *B23K 9/16* (2013.01)

(58) Field of Classification Search
None
See application file for complete search history.

(56) References Cited

U.S. PATENT DOCUMENTS 5,233,158 A * 8/1993 Karakama ............... B23K 9/073
219/130.33
10,828,714 B1 * 11/2020 Cox ..................... B23K 9/1062
(Continued)

FOREIGN PATENT DOCUMENTS

JP 2014-159034 A 9/2014

OTHER PUBLICATIONS

International Search Report mailed on Feb. 16, 2021 PCT/JP2020/045554 filed on Dec. 7, 2020, 2 pages.

*Primary Examiner* — Elizabeth M Kerr
(74) *Attorney, Agent, or Firm* — Oblon, McClelland, Maier & Neustadt, L.L.P.

(57) ABSTRACT

Gas-shielded arc welding in which the tip-to-work distance changes is configured so that fluctuations in welding current are curbed while arc length control is maintained. This is achieved with a corrected current calculating unit that includes a first controlling expression where a first gain G1 is multiplied by an instantaneous voltage error value that is the difference between an instantaneous output voltage setting value and an output voltage detection value, and/or a second controlling expression where a second gain G2 is multiplied by an average voltage error value that is the difference between an output voltage setting value and an average output voltage detection value of a pre-set period of time, determines an arc property gain G1 and/or G2 based on a torch position detection value determined by a torch position determinator, and calculates a corrected current based on the first and/or the second controlling expression.

12 Claims, 9 Drawing Sheets

(56) References Cited

U.S. PATENT DOCUMENTS

| | | | | |
|---|---|---|---|---|
| 2011/0198331 | A1* | 8/2011 | Shigeyoshi | B23K 9/126 |
| | | | | 219/130.32 |
| 2013/0299475 | A1* | 11/2013 | Aoki | B23K 9/0216 |
| | | | | 219/124.03 |
| 2015/0375331 | A1* | 12/2015 | Hutchison | B23K 9/09 |
| | | | | 219/136 |

* cited by examiner

| WELDING VOLTAGE AND CURRENT | 36.5 V, 350 A |
| --- | --- |
| FEED RATE | 14.4 m/min |
| WELDING RATE | 35 cm/min |
| WEAVING WIDTH | 6 mm |
| NUMBER OF WEAVING PROCESSES | 120 TIMES/min |
| PROTRUSION LENGTH | 25 mm |
| WELDING MODE | CV MODE |
| TYPE OF SHIELDING GAS | $CO_2$ 100% |

TYPE OF WIRE: MG-50R Φ1.2
TYPE OF STEEL PLATE: SS400

USE FIXED ARC PROPERTY GAIN DURING WEAVING

UPPER PLATE

LOWER PLATE

OUTPUT CONTROL METHOD FOR GAS-SHIELDED ARC WELDING, WELDING SYSTEM, WELDING POWER SOURCE, AND WELDING CONTROL DEVICE

TECHNICAL FIELD

The present invention relates to output control methods for gas-shielded arc welding, welding systems, welding power sources, and welding control devices to be applied when performing a welding process in a condition where the tip-to-work distance changes, such as during weaving.

BACKGROUND ART

Gas-shielded arc welding within a groove is normally performed while weaving. When weaving is performed within a groove, the tip-to-work distance occasionally changes, so that the arc length becomes unstable, resulting in an increase in the number of occurrences of spatter. Accordingly, gas-shielded arc welding within a groove is problematic in terms of welding workability mainly regarding an increase in spatter. The tip-to-work distance is also called a protrusion length.

As a solution to this problem, Patent Literature 1 discloses a MAG welding device that can maintain the weld quality by suppressing incomplete penetration, groove gouging, and spatter, regardless of the type of welding wire, even in a case of a narrow groove. According to the technology described in Patent Literature 1, even in the case of a narrow groove with a groove angle of 10° to 40°, shielding gas with a $CO_2$ mixture ratio of 20% to 40% is supplied from a welding torch toward the groove, and the gradient of the external characteristic of a welding power source that supplies a welding current between a welding wire and a steel pipe is set to −17V to −10 V/100 A, so that incomplete penetration, groove gouging, and spatter are suppressed regardless of the type of welding wire, whereby welding can be performed on the groove while the weld quality is maintained.

CITATION LIST

Patent Literature

PTL 1: Japanese Unexamined Patent Application Publication No. 2014-159034

SUMMARY OF INVENTION

Technical Problem

However, in Patent Literature 1, the shielding-gas composition is limited to the $CO_2$ mixture ratio of 20% to 40%, meaning that generic 100% $CO_2$ gas cannot be used. Moreover, the gradient of the external characteristic of the welding power source is limited within the range of −17 V to −10 V/100 A. The welding current fluctuates less during fluctuations in the feeding-tip-to-work distance as the gradient of the external characteristic increases, that is, decreases as a value. Although this is preferable in arc tracking and welding current control, the arc length, that is, the arc voltage, fluctuates more, thus causing the self-regulating function of the arc length to become ineffective.

On the other hand, as the gradient of the external characteristic decreases, that is, approaches 0 as a value, the external characteristic tends to become a constant voltage characteristic, thus causing the self-regulating function of the arc length to become effective and leading to a stable arc. However, since the welding current fluctuates more and the accuracy of a feedback current command value decreases, the arc tracking and the welding current control are adversely affected, thus resulting in poor welding workability.

In other words, it, is difficult to suppress fluctuations in welding current, while simultaneously maintaining arc length control from the external characteristic alone.

The present invention has been made in view of the problem mentioned above, and an object thereof is to suppress fluctuations in welding current while maintaining arc length control, irrespective of shielding gas, in gas-shielded arc welding in which the tip-to-work distance changes, thereby obtaining favorable welding workability and achieving more accurate arc tracking when welding is performed by weaving.

Solution to Problem

Accordingly, the aforementioned object of the present invention is achieved in accordance with the configuration of the following item (1) related to an output control method for gas-shielded arc welding.

(1) Provided is an output control method for performing gas-shielded arc welding in which a tip-to-work distance changes during the welding. The gas-shielded arc welding is performed by using a welding system having a welding control device and a welding power source.

At least one of the welding control device and the welding power source has torch-position determining means for determining a welding torch position during the welding.

The welding power source has correction-current calculating means for calculating a correction current for feedback control.

The correction-current calculating means includes at least one of:
a first controlling expression in which an instantaneous-voltage error value Dv1 serving as a difference between an instantaneous-output-voltage setting value Va and an output-voltage detection value Vd is multiplied by a first gain G1, and
a second controlling expression in which an average-voltage error value Dv2 serving as a difference between an output-voltage setting value Vs and an average-output-voltage detection value Vave in a preset period is multiplied by a second gain G2.

The output control method includes:
setting at least one of the first gain G1 and the second gain G2 based on a torch-position detection value determined by the torch-position determining means; and
calculating the correction current based on at least one of the first controlling expression and the second controlling expression.

According to this configuration, in gas-shielded arc welding in which the tip-to-work distance changes, fluctuations in welding current are suppressed while arc length control is maintained, irrespective of the shielding gas, thereby obtaining favorable welding workability and achieving more accurate arc tracking when welding is performed by weaving.

Preferred embodiments of the present invention related to the output control method for gas-shielded arc welding relate to the following items (2) to (10).

(2) The output control method for gas-shielded arc welding according to the item (1) further includes performing control to increase at least one of the first gain G1 and the second gain G2 if the torch-position determining means detects the torch-position detection value based on which the tip-to-work distance is determined to be small.

According to this configuration, welding can be performed while maintaining the arc length substantially fixed to achieve a favorable bead shape.

(3) In the output control method for gas-shielded arc welding according to the item (1) or (2), the gas-shielded arc welding in which the tip-to-work distance changes is weaving-welding.

Three or more preliminarily-segmented torch position sections are set within a range in which a welding torch performs weaving.

The torch-position determining means determines that a torch position has changed when the welding torch enters each of the torch position sections during the weaving, and outputs the torch-position detection value.

According to this configuration, the torch-position detection value can be output for each of the three or more preliminarily-segmented torch position sections.

(4) In the output control method for gas-shielded arc welding according to the item (3), the torch position sections include at least two independently-set sections including a central section and a weaving end section. The central section includes a position where the tip-to-work distance is the largest. The weaving end section includes an end of the weaving.

According to this configuration, the torch-position detection value can be output for each of the central position including the position where the tip-to-work distance is the largest and the weaving end position including the end of the weaving.

(5) In the output control method for gas-shielded arc welding according to the item (4), at least one of the first gain G1 and the second gain G2 when the welding torch is positioned in the weaving end section is controlled to be higher than at least one of the first gain G1 and the second gain G2 when the welding torch is positioned in the central section.

According to this configuration, in the weaving end section, at least one of the first gain G1 and the second gain G2 can be increased, and the arc length can be maintained substantially fixed.

(6) In the output control method for gas-shielded arc welding according to any one of the items (3) to (5), if at least one of the first gain G1 and the second gain G2 is to be controlled for each of the torch position sections, the output control method further includes:

starting to increase or decrease the at least one of the first gain G1 and the second gain G2 at a boundary or near the boundary of each torch position section; and setting an increasing-decreasing rate of the at least one of the first gain G1 and the second gain G2 between $0.05/\mu s$ and $0.10/\mu s$.

According to this configuration, the first gain and the second gain can each be increased and decreased smoothly at the boundary of each torch position section.

(7) In the output control method for gas-shielded arc welding according to the item (4) or (5), the weaving end section has a width of 20% to 80% of half a distance of a weaving width by which the welding torch performs the weaving.

According to this configuration, the external appearance of a welded area in the weaving end section can be improved.

(8) In an output control method for gas-shielded arc welding in which a welding current has a non-steady response section and a steady response section, the output control method includes:

using the output control method according to any one of the items (1) to (7) to calculate the correction current in the steady response section.

According to this configuration, in welding performed in the steady response section, fluctuations in welding current are suppressed while arc length control is maintained, thereby obtaining favorable welding workability and achieving more accurate arc tracking.

(9) In the output control method for gas-shielded arc welding according to the item (8), the non-steady response section is a waveform control section of the welding current.

According to this configuration, more favorable welding workability is obtained.

(10) In the output control method for gas-shielded arc welding according to the item (8), the non-steady response section is a transient response section of the welding current.

According to this configuration, more favorable welding workability is obtained.

Furthermore, the aforementioned object of the present invention is achieved in accordance with the configuration of the following item (11) related to a welding system.

(11) Provided is a welding system having a welding control device and a welding power source and for performing gas-shielded arc welding in which a tip-to-work distance changes during the welding.

At least one of the welding control device and the welding power source has torch-position determining means for determining a welding torch position during the welding.

The welding power source has correction-current calculating means for calculating a correction current for feedback control.

The correction-current calculating means includes at least one of a first controlling expression in which an instantaneous-voltage error value Dv1 serving as a difference between an instantaneous-output-voltage setting value Va and an output-voltage detection value Vd is multiplied by a first gain G1, and a second controlling expression in which an average-voltage error value Dv2 serving as a difference between an output-voltage setting value Vs and an average-output-voltage detection value Vave in a preset period is multiplied by a second gain G2.

The correction-current calculating means sets at least one of the first gain G1 and the second gain G2 based on a torch-position detection value determined by the torch-position determining means.

The correction-current calculating means calculates the correction current based on at least one of the first controlling expression and the second controlling expression.

According to this configuration, in gas-shielded arc welding in which the tip-to-work distance changes, fluctuations in welding current are suppressed while arc length control is maintained, irrespective of the shielding gas, thereby obtaining favorable welding workability and achieving more accurate arc tracking when welding is performed by weaving.

Furthermore, the aforementioned object of the present invention is achieved in accordance with the configuration of the following item (12) related to a welding power source.

(12) Provided is a welding power source for performing gas-shielded arc welding in which a tip-to-work distance changes during the welding. The welding power source includes:

torch-position determining means for determining a welding torch position during the welding; and correction-current calculating means for calculating a correction current for feedback control.

The correction-current calculating means includes at least one of a first controlling expression in which an instantaneous-voltage error value Dv1 serving as a difference between an instantaneous-output-voltage setting value Va and an output-voltage detection value Vd is multiplied by a first gain G1, and a second controlling expression in which an average-voltage error value Dv2 serving as a difference between an output-voltage setting value Vs and an average-output-voltage detection value Vave in a preset period is multiplied by a second gain G2.

The correction-current calculating means sets at least one of the first gain G1 and the second gain G2 based on a torch-position detection value determined by the torch-position determining means.

The correction-current calculating means calculates the correction current based on at least one of the first controlling expression and the second controlling expression.

According to this configuration, in gas-shielded arc welding in which the tip-to-work distance changes, fluctuations in welding current are suppressed while arc length control is maintained, irrespective of the shielding gas, thereby obtaining favorable welding workability and achieving more accurate arc tracking when welding is performed by weaving.

Furthermore, the aforementioned object of the present invention is achieved in accordance with the configuration of the following item (13) related to a welding control device.

(13) Provided is a welding control device used together with a welding power source for performing gas-shielded arc welding in which a tip-to-work distance changes during the welding. The welding control device includes:

torch-position determining means for determining a welding torch position during the welding.

The welding power source has correction-current calculating means for calculating a correction current for feedback control.

The correction-current calculating means includes at least one of a first controlling expression in which an instantaneous-voltage error value Dv1 serving as a difference between an instantaneous-output-voltage setting value Va and an output-voltage detection value Vd is multiplied by a first gain G1, and a second controlling expression in which an average-voltage error value Dv2 serving as a difference between an output-voltage setting value Vs and an average-output-voltage detection value Vave in a preset period is multiplied by a second gain G2.

The welding power source sets at least one of the first gain G1 and the second gain G2 based on a torch-position detection value determined by the torch-position determining means.

The welding power source calculates the correction current based on at least one of the first controlling expression and the second controlling expression.

According to this configuration, in gas-shielded arc welding in which the tip-to-work distance changes, fluctuations in welding current are suppressed while arc length control is maintained, irrespective of the shielding gas, thereby obtaining favorable welding workability and achieving more accurate arc tracking when welding is performed by weaving.

Advantageous Effects of Invention

According to the present invention, in gas-shielded arc welding in which the tip-to-work distance changes, fluctuations in welding current are suppressed while arc length control is maintained, irrespective of the shielding gas, thereby obtaining favorable welding workability and achieving more accurate arc tracking when welding is performed by weaving.

DESCRIPTION OF EMBODIMENTS

An embodiment, according to the present, invention will be described below with reference to the drawings. This embodiment, is an example where a welding robot is used, and tracking control according to the present invention is not to be limited to the configuration according to this embodiment. For example, an automatic welding device that uses a vehicle may be equipped with the tracking control according to the present invention.

[General Outline of Arc Welding System]

Figure 1:
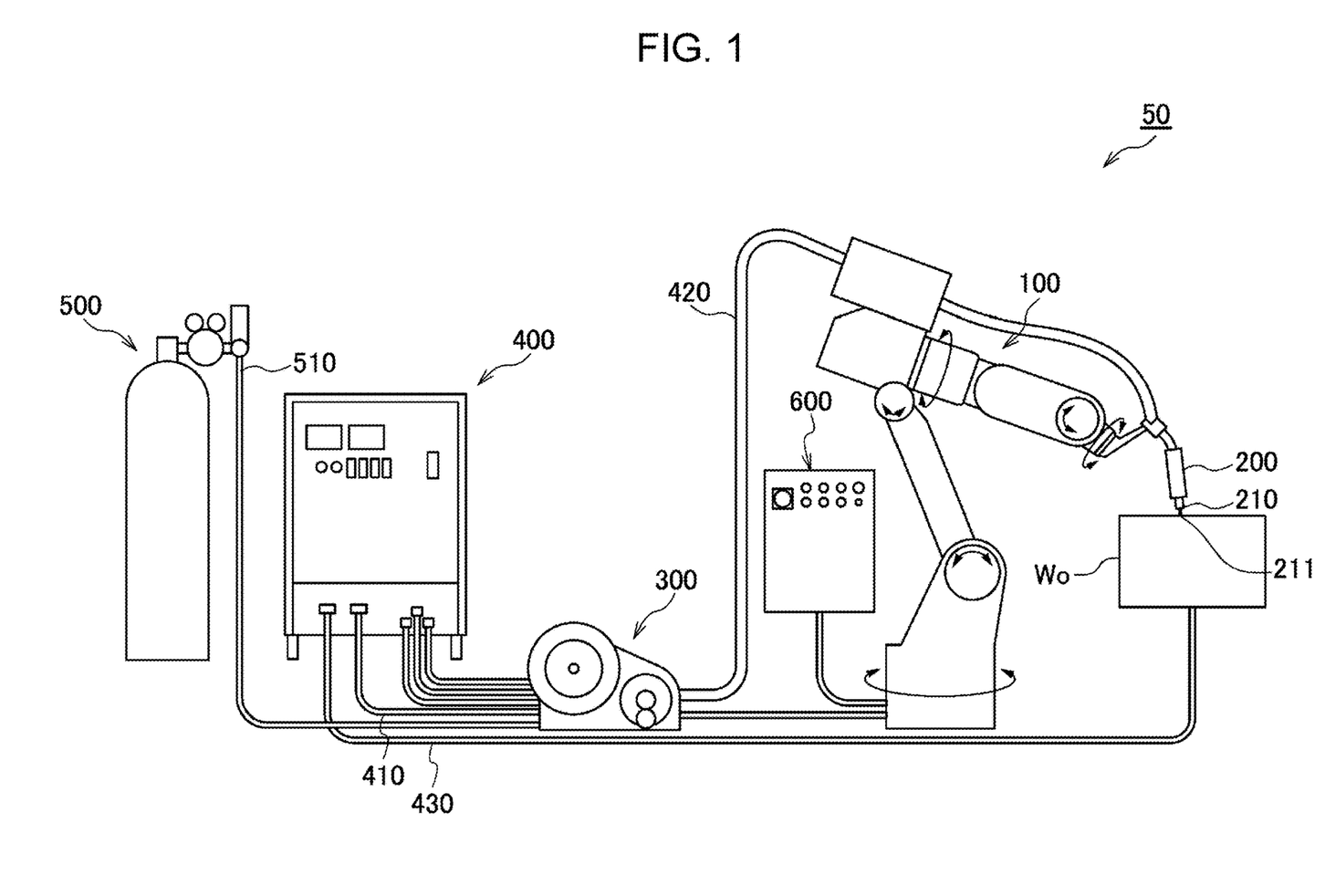
FIG. 1 schematically illustrates a configuration example of an arc welding system according to the present invention.

FIG. 1 schematically illustrates a configuration example of an arc welding system according to this embodiment. An arc welding system 50 includes a welding robot 100, a feeder 300, a welding power source 400, a shielding-gas supplier 500, and a welding control device 600.

The welding power source 400 is connected to a welding wire 211, serving as an expendable electrode, via a positive power cable 410, and is connected to a workpiece Wo, serving as an object to be welded, via a negative power cable 430. These connections correspond to a case where welding is to be performed with reversed polarity. In a case where welding is to be performed with positive polarity, the welding power source 400 is connected to the workpiece Wo via a positive power cable and is connected to the welding wire 211 via a negative power cable.

The welding power source 400 and the feeder 300 for the welding wire 211 are connected by a signal line, such that the welding-wire feed rate can be controlled.

The welding robot 100 includes a welding torch 200 as an end effector. The welding torch 200 has an electrifying mechanism, that is, a contact tip, for applying electricity to the welding wire 211. As a result of receiving electricity from the contact tip, the welding wire 211 generates an arc from the distal end, and uses the heat thereof to weld the workpiece Wo serving as a target to be welded.

Furthermore, the welding torch 200 includes a shielding-gas nozzle 210 serving as a mechanism that emits shielding gas. The shielding gas may be carbon dioxide gas, argon gas, or a mixture of, for example, argon and $CO_2$. Carbon dioxide gas is preferable. In the case of mixed gas, it is preferable that Ar is mixed with 10% to 30% of carbon dioxide gas. The shielding gas is supplied from the shielding-gas supplier 500.

The welding wire 211 used in this embodiment may either be a flux-less solid wire or a flux-cored wire containing a flux. The material of the welding wire 211 is not limited. For example, the material may be soft steel, stainless steel, aluminum, or titanium, and the wire surface may be plated with, for example, Cu. Moreover, the diameter of the welding wire 211 is not particularly limited. In this embodiment, it is preferable that the upper limit, for the diameter be 1.6 mm and the lower limit, be 0.8 min.

The workpiece Wo has a joint, shape for fillet, welding or groove welding, and the joint shape is not particularly limited so long as the joint shape is for either of these welding techniques. Examples of fillet welding include downward fillet welding and horizontal fillet welding. The angle of the fillet is not particularly limited and may be a non-right angle. The groove shape in groove welding is not particularly limited and may be, for example, a V-shape, a check-mark shape, or a U-shape.

Figure 2:
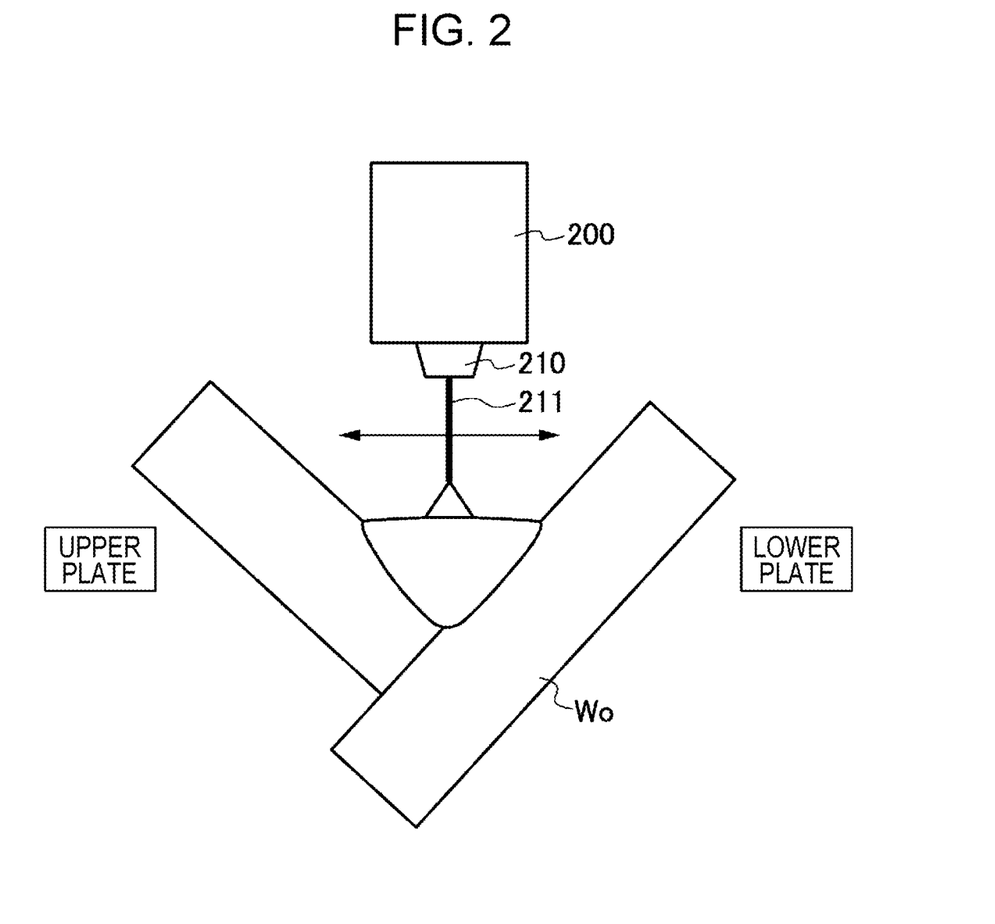
FIG. 2 schematically illustrates a state where welding is performed on a groove by weaving.

As shown in FIG. 2, in this embodiment, the workpiece Wo has a groove. The workpiece Wo shown in the drawing is as viewed from the welding direction. Welding is performed on the workpiece Wo while weaving the welding torch 200 attached to the welding robot 100 in the left-right direction indicated by an arrow in the drawing. In other words, the description of this embodiment relates to an example where weaving-welding in downward welding is performed as an example of welding in which the tip-to-work distance changes.

The welding control device 600 controls the operation of the welding robot 100. The welding control device 600 has teaching data that preliminarily specifies an operation pattern of the welding robot 100, a welding start position, a welding end position, welding conditions, and a weaving operation, and controls the operation of the welding robot 100 by giving these instructions to the welding robot 100. Furthermore, in accordance with the teaching data, the welding control device 600 sends the welding conditions, such as a welding current, a welding voltage, and a feed rate, to be applied during a welding process to the welding power source 400.

In response to a command from the welding control device 600, the welding power source 400 supplies electric power to the welding wire 211 and the workpiece Wo, thereby generating an arc between the welding wire 211 and the workpiece Wo. Moreover, in response to the command from the welding control device 600, the welding power source 400 outputs, to the feeder 300, a signal for controlling the rate for feeding the welding wire 211.

[Functional Configuration of Welding Control Device]

The welding control device 600 includes a teaching-data storage unit (not shown) that stores preliminarily-created teaching data, a teaching data analyzer (not shown) that analyzes the teaching data, a trajectory planner (not shown) that generates servo command information used for giving a command to a robot driver, that is, a servo driver, for controlling each axis of the welding robot 100, and a torch position detector 610 (see FIG. 3; also referred to as "torch-position determining means" hereinafter) that detects the torch position based on the servo command information.

Figure 3:
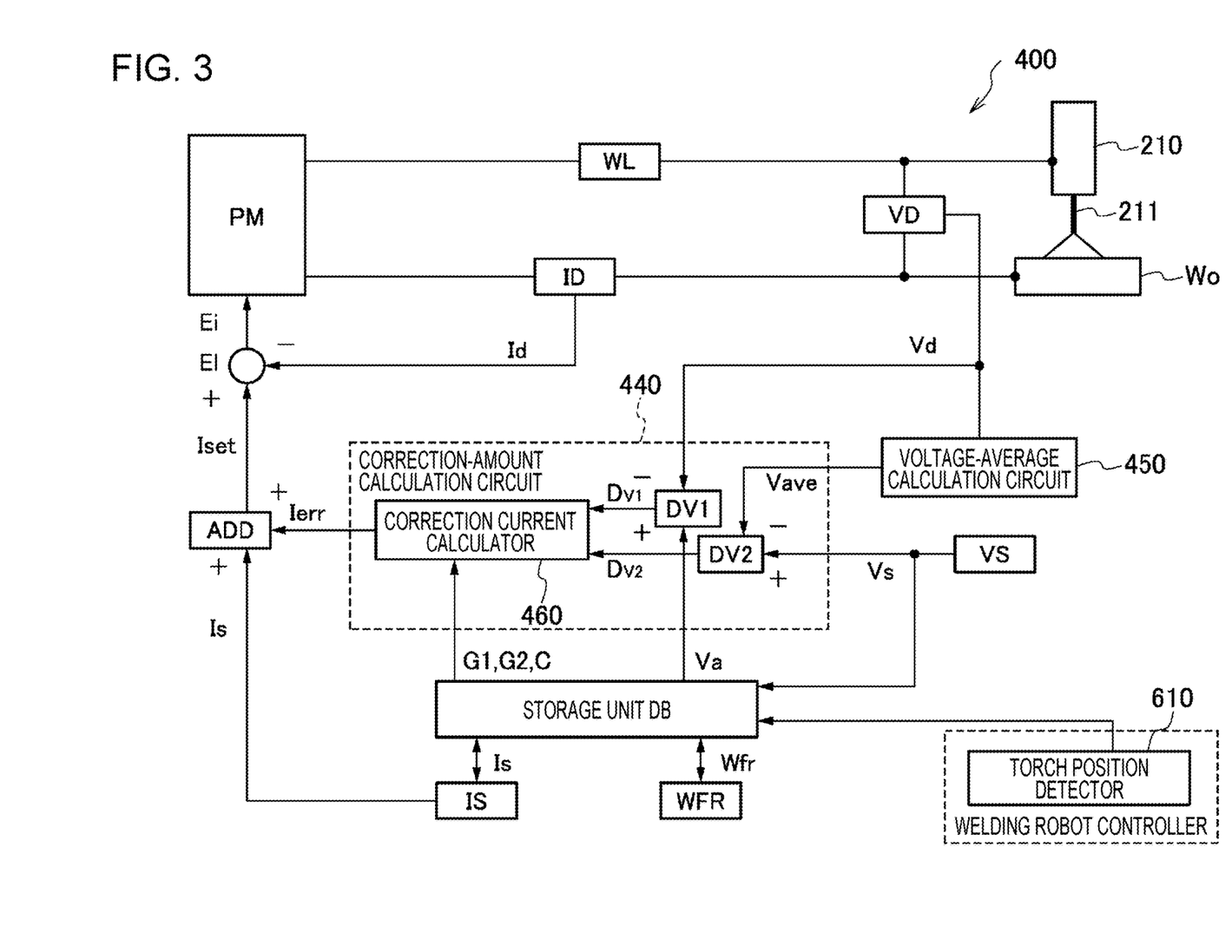
FIG. 3 is a block diagram of a welding power source.

The torch position detector 610 is not particularly limited, and can measure a change in the welding current and determine the torch position by using, for example, an arc sensor that tracks a groove width, a laser sensor, or a vision sensor. Moreover, storing as data in a data storage unit is also possible.

The torch position information obtained by the torch position detector 610 is input as a digital signal to the welding power source 400. The torch position detector 610 may be provided within the welding power source 400. In that case, the servo command information from the welding control device 600 may be input to the torch position detector within the welding power source 400. The torch position information input to the welding power source 400 is output to a storage unit DB of the welding power source 400.

The teaching-data storage unit stores teaching data that specifies, for example, the operation pattern of the welding robot 100. An operator creates the teaching data in advance by using a teaching device (not shown). The creating method may involve the use of a device other than a teaching pendant. For example, the teaching data may be created using a personal computer, and may be stored in the teaching-data storage unit via wireless or wired communication.

The teaching data analyzer retrieves the teaching data from the teaching-data storage unit when, for example, an operation for starting a welding process is performed, and analyzes the teaching data. As a result of this analysis of the teaching data, teaching trajectory information and welding-condition command information are generated. The teaching trajectory information is information specifying the trajectory of the welding robot 100 in the welding process including the welding rate and the weaving conditions. The welding-condition command information is information used for giving commands related to a welding current, a welding voltage, and a feed rate in a welding process, and includes a control command for each welding condition, including an arc on/off command. The teaching data analyzer outputs the generated teaching trajectory information to the trajectory planner. Moreover, the teaching data analyzer may output the generated welding-condition command information to the welding power source 400.

The trajectory planner calculates a target position for the welding robot 100 based on the teaching trajectory information input from the teaching data analyzer, and generates servo command information for controlling each axis of the welding robot 100. Then, the trajectory planner outputs the generated servo command information to the driver of the welding robot 100. In accordance with the servo command information, the welding robot 100 performs an operation based on the teaching data. The servo command information includes weaving-position command information for designating a position where the welding torch 200 is to be weaved.

The welding control device 600 is preferably provided with functions of means for detecting a lateral deviation in weaving and correction-amount calculating means for calculating a correction amount to the center of weaving based on the detected lateral deviation and inputting the correction amount to the trajectory planner. Accordingly, the trajectory planner can reset the weaving-position command information based on the correction amount and output the servo command information to the driver of the welding robot. The means for detecting a lateral deviation in weaving is not particularly limited, and may be, for example, means for detecting a lateral deviation from an arc sensor.

[Functional Configuration of Welding Power Source]

As shown in FIG. 3, the welding power source 400 includes a power supplier PM that supplies electric power for generating an arc and performing welding, an adding circuit ADD that receives a signal, such as a feed rate command, a welding current command, or a welding voltage command, and calculates a control amount of the power supplier PM, a voltage detector VD that detects a welding voltage during welding and outputs a welding-voltage detection signal Vd, a current detector ID that detects a welding current during welding and outputs a welding-current detection signal Id, and a correction-amount calculation circuit 440 that calculates a correction amount for the control amount of the power supplier PM.

The power supplier PM of the welding power source 400 receives, for example, three-phase 200 V from a commercial power source, performs output control on the input alternating-current voltage by using, for example, inverter control, an inverter transformer, and a rectifier in accordance with an error amplification signal output from a power source controller (not shown), and outputs a welding voltage and a welding current. Moreover, a reactor WL may be configured for smoothing the output voltage.

The current detector ID detects the welding current during welding and outputs the welding-current detection signal Id. The welding-current detection signal Id is digitally converted by an A/D converter (not shown) and is input to a current-error amplification circuit EI and another control circuit (not shown), which may be, for example, a correction circuit, such as a current control circuit for pulse generation. The current-error amplification circuit EI inputs a current-error amplification signal Ei, serving as an error amplification signal between a control-output-current setting signal Iset, to be described later, and the welding-current detection signal Id, to the power supplier PM. The power supplier PM performs output control by using, for example, inverter control, the inverter transformer, and the rectifier in accordance with the current-error amplification signal Ei, and outputs a welding voltage and a welding current.

The voltage detector VD detects the welding voltage during welding and outputs the welding-voltage detection signal Vd. The welding-voltage detection signal Vd is digitally converted by an A/D converter and is input to a voltage-average calculation circuit 450, to be described later, the correction-amount calculation circuit 440, and another control circuit (not shown), which may be, for example, a correction circuit, such as a short-circuit determination circuit.

The adding circuit ADD receives a correction current Ierr output from the correction-amount calculation circuit 440. The adding circuit ADD adds the correction current Ierr and a welding-current setting signal Is output from a welding-current setting circuit IS, and outputs the control-output-current setting signal Iset to the current-error amplification circuit EI. The correction current Ierr input to the adding circuit ADD may be not only the correction current Ierr output from the correction-amount calculation circuit 440 but also a correction current output from other correction circuits (not shown). Examples of other correction circuits include a correction circuit for controlling a short-circuit period or an arc period and a correction circuit for controlling external characteristics.

[Functional Configuration of Correction-Amount Calculation Circuit]

The correction-amount calculation circuit 440 includes a correction current calculator 460, an instantaneous voltage calculator DV1, and an average voltage calculator DV2.

The instantaneous voltage calculator DV1 receives the welding-voltage detection signal Vd and an instantaneous-output-voltage setting signal Va, to be described later, and outputs an instantaneous-voltage error signal Dv1 as a difference Va−Vd therebetween to the correction current calculator 460.

The average voltage calculator DV2 receives an output-voltage setting signal Vs output from an output-voltage setting circuit VS and an average-output-voltage detection signal Vave output from the voltage-average calculation circuit 450, and outputs an average-voltage error signal Dv2 as a difference Vs−Vave therebetween to the correction current calculator 460. The voltage-average calculation circuit 450 calculates the average-output-voltage detection signal Vave as an average of the welding-voltage detection signal Vd in a predetermined period.

The correction current calculator 460 receives the instantaneous-voltage error signal Dv1 and the average-voltage error signal Dv2, and outputs the correction current Ierr in accordance with, for example, calculation expression (1) indicated below.

$$Ierr = G1 \times (Dv1 + C) + G2 \times Dv2 \quad (1)$$

In this case, each of G1 and G2 is a correction coefficient (also referred to as "arc property gain" hereinafter), and C is a correction value (constant) set in advance. The correction coefficients G1 and G2 and the correction value C are output from the storage unit DB (database), and optimal correction coefficients G1 and G2 and an optimal correction value C are set in accordance with the torch position information input to the storage unit DB from the torch position detector 610. For example, the storage unit DB has a database for the torch position versus the correction coefficients G1 and G2 and the correction value C, and the correction coefficients G1 and G2 and the correction value C are output in accordance with the database.

The correction current calculator 460 may receive either of the instantaneous-voltage error signal Dv1 and the average-voltage error signal Dv2, but preferably uses both for achieving enhanced accuracy.

The storage unit DB may also have an external characteristic coefficient of the welding power source (also referred to as "output characteristic of the welding power source"), and may change the external characteristic coefficient in accordance with the torch position. In this embodiment, the correction coefficients G1 and G2 may each include an external characteristic coefficient. Moreover, the storage unit DB receives a wire-feed-rate setting signal Wfr from a wire-feed-rate setting circuit WFR and stores the wire-feed-rate setting signal Wfr.

The instantaneous-output-voltage setting signal Va is input to the storage unit DB in advance. The instantaneous-output-voltage setting signal Va is a setting signal with respect to an instantaneous voltage change that occurs during a relevant transient response in, for example, waveform control involving changing of load using an electronic reactor. In this embodiment, control is performed such that the instantaneous-output-voltage setting signal Va is changed linearly with respect to a transient response period.

A function and a coefficient, that is, a gradient, for changing the instantaneous-output-voltage setting signal Va with respect to the transient response period are input to the storage unit DB in advance. In a steady response period, Va is a fixed value.

[Output Control Method for Gas-Shielded Arc Welding]

Next, an output, control method for gas-shielded arc welding will be described in detail with reference to FIG. 4. As mentioned above, the storage unit, DB has the arc property gains G1 and G2 stored therein in advance for each torch position. Alternatively, a relational expression between a tip-to-work distance as a torch position and the arc property gains G1 and G2 may be stored in the storage unit DB.

Figure 4:
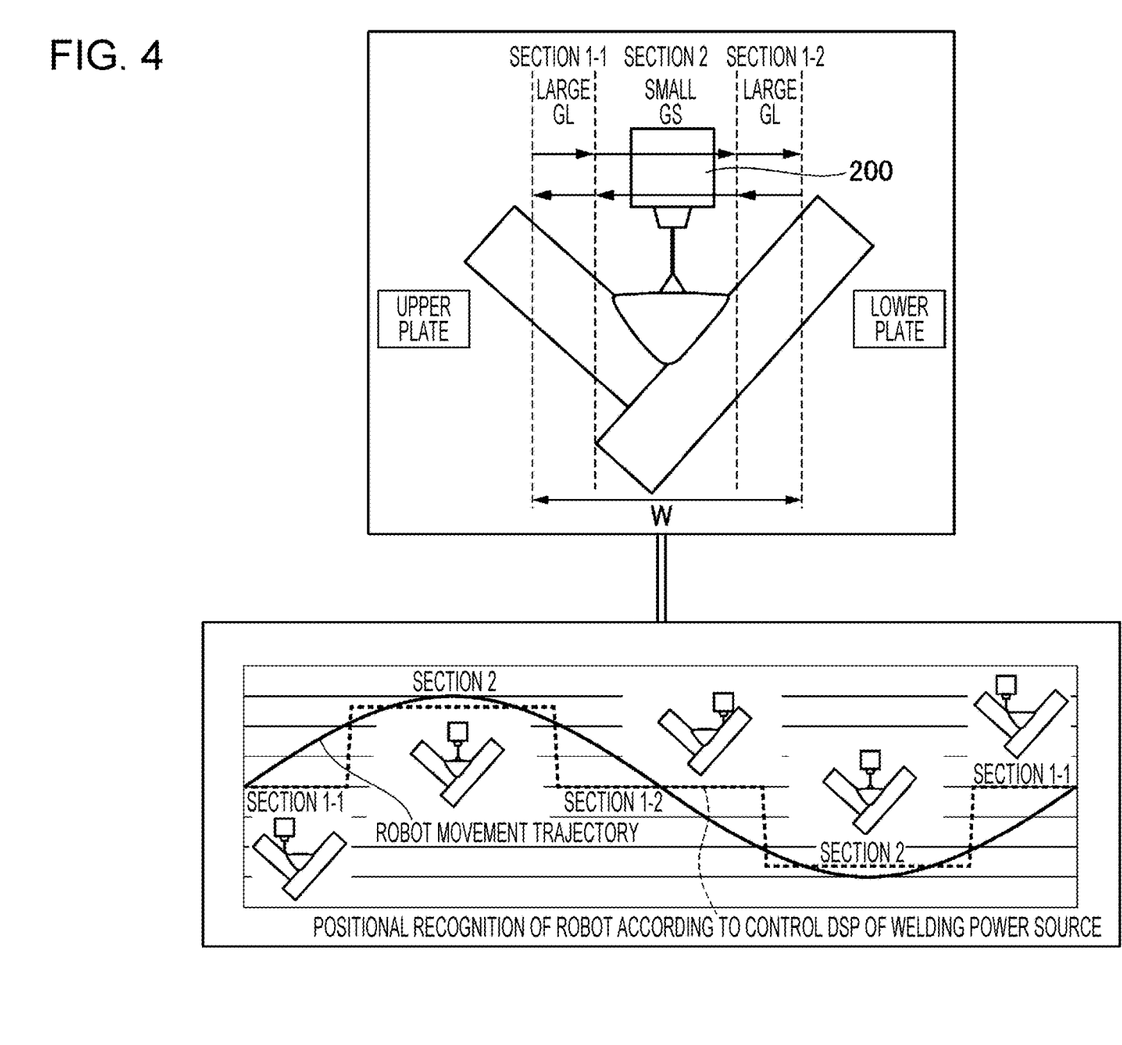
FIG. 4 is a diagram for explaining how weaving-welding is performed on a groove by changing an arc property gain in accordance with the tip-to-work distance.

In the embodiment shown in FIG. 4, a weaving width W as a movable range for weaving is segmented into three sections, namely, a section 1-1, a section 2, and a section 1-2. Furthermore, at least one of the arc property gains G1 and G2 in each section is varied in accordance with the arc property gains G1 and G2 stored in the storage unit DB for each torch position.

In the following description, the two arc property gains G1 and G2 will collectively be referred to as an arc property gain G. Arc-property-gain control preferably involves occasionally changing an optimal arc property gain with respect to each torch position, that is, the tip-to-work distance. However, from the standpoint of performing the control simply, the arc property gain may be controlled for each movable range set in advance, as in the embodiment shown in FIG. 4. Furthermore, in this embodiment, the section 2 where the tip-to-work distance is large undergoes control such that the arc property gain is reduced relative to that in the section 1-1 or the section 1-2 where the tip-to-work distance is small. Accordingly, there is a tendency in which the arc property gain is controlled to be lower as the tip-to-work distance at each torch position increases. Thus, in the embodiment shown in FIG. 4, the arc property gain in the section 2 is reduced relative to that in the section 1-1 or the section 1-2 and is thus indicated with "GS" as a small arc property gain for the sake of convenience, whereas the arc property gain in the section 1-1 or the section 1-2 is increased relative that in the section 2 and is thus indicated with "GL" as a large arc property gain for the sake of convenience.

As shown in FIG. 4, when weaving-welding is to be performed such that the welding torch 200 moves rightward from the left end of the weaving width W, makes a U-turn at the right end of the weaving width W, and returns toward the left end of the weaving width W, the welding torch 200 moves leftward and rightward as indicated with a sinusoidal waveform. This movement of the welding torch 200 is recognized as three segmented sections, as indicated with a rectangular wave in the lower part of FIG. 4, by the torch position detector 610 shown in FIG. 3.

In each of the section 1-1 and the section 1-2, the large arc property gain GL is input to the correction current calculator 460, the correction current Ierr is calculated, and the control-output-current setting signal Iset is corrected. Accordingly, in the section 1-1 and the section 1-2 serving as the left and right ends (also referred to as "weaving ends" hereinafter) of the weaving width W, arc length control further stabilizes, thereby contributing to enhanced welding workability. In the section 2, the small arc property gain GS is input to the correction current calculator 460, the correction current Ierr is calculated, and the control-output-current setting signal Iset is corrected. Accordingly, the number of occurrences of spatter is reduced.

Accordingly, in welding performed in each of the section 1-1 and the section 1-2 having the small tip-to-work distance and serving as the left and right ends of the weaving width W, the arc property gain G is increased, that is, the large arc property gain GL is used, so that the arc length is maintained substantially fixed, thereby performing the welding to yield favorable toe conformability. In welding performed in the section 2 having the large tip-to-work distance and serving as the central section, the arc property gain G is reduced, that is, the small arc property gain GS is used, so that current fluctuations are suppressed, thereby performing the welding with a reduced number of occurrences of spatter.

Accordingly, in gas-shielded arc welding in which the tip-to-work distance within a groove changes, the welding is performed while the arc property gain G is changed based on the torch position information detected by the torch position detector 610, so that fluctuations in the welding current are suppressed while the arc length control is maintained, thereby enabling arc welding with higher accuracy.

In the case where the weaving width W is segmented into three sections, the arc property gain G is changed from GL to GS or from GS to GL at the boundary of each section. A specific changing method involves, for example, (a) changing the arc property gains G1 and G2 in a stepwise fashion when the welding torch 200 reaches the boundary of each section, (b) starting the changing process in front of the boundary and ending the changing process at the boundary, or (c) starting the changing process in front of the boundary and performing the changing process astride the boundary such that the changing process is completed after the boundary is passed. Although any of the methods is appropriately selectable depending on conditions, such as the groove shape, it is preferable that the increasing-decreasing rate of each of the arc property gains G1 and G2 be changed linearly between, for example, 0.05/µs and 0.10/µs. Accordingly, the first gain G1 and the second gain G2 can each be increased and decreased smoothly at the boundary of each torch position section.

With regard to the number of segmented sections, it is preferable from the standpoint of control in this embodiment that three or more segmented sections be provided. It, is further preferable that, the sections at, least, include a section (i.e., the section 2) where the tip-to-work distance is the largest and sections located at, the left and right ends (i.e., the section 1-1 and the section 1-2) of the weaving width W. Accordingly, a torch-position detection value can be output for each of the three or more preliminarily-segmented torch position sections. Moreover, a torch-position detection value can be output for each of the central section including the position where the tip-to-work distance is the largest and the weaving end sections including the weaving ends.

In the case where the weaving width W is segmented into three sections, the section 1-1 and the section 1-2 serving as the left and right ends of the weaving width W may be set to a width of 20% to 80% of half the distance of the weaving width W (W/2), preferably 40 to 70% thereof, and more preferably 50 to 60% thereof. Accordingly, the external appearance of welded areas in the weaving end sections can be improved.

The control of the arc property gain G may be applied only to a certain fixed section of the welding current. In this case, the fixed section refers to a steady response section, whereas a section other than the fixed section is a non-steady response section. For example, if waveform control is to be performed in a specific section of the welding current in response to a certain trigger, a section where the waveform control is performed is a non-steady response section, whereas a section where the waveform control is not performed is a steady response section. Normally, constant current control is performed when waveform control is performed, whereas constant voltage control is performed when waveform control is not performed. Therefore, when constant current control is to be performed in a specific section in response to a certain trigger, it may be regarded that the section where the constant current control is performed is a non-steady response section, whereas a section where constant voltage control is performed is a steady response section. Furthermore, as described in Japanese Unexamined Patent Application Publication No. 2016-159316, when there is a mixture of a short-circuit period as an example of a transient response section and an arc period (non-short-circuit period), the short-circuit period corresponds to a non-steady response section, whereas the arc period corresponds to a steady response section. Moreover, the welding conditions may be changed together with the control of the arc property gain G. Examples of the welding conditions include the welding current, the welding voltage, the welding rate, the waveform control, and the frequency.

Figure 5:
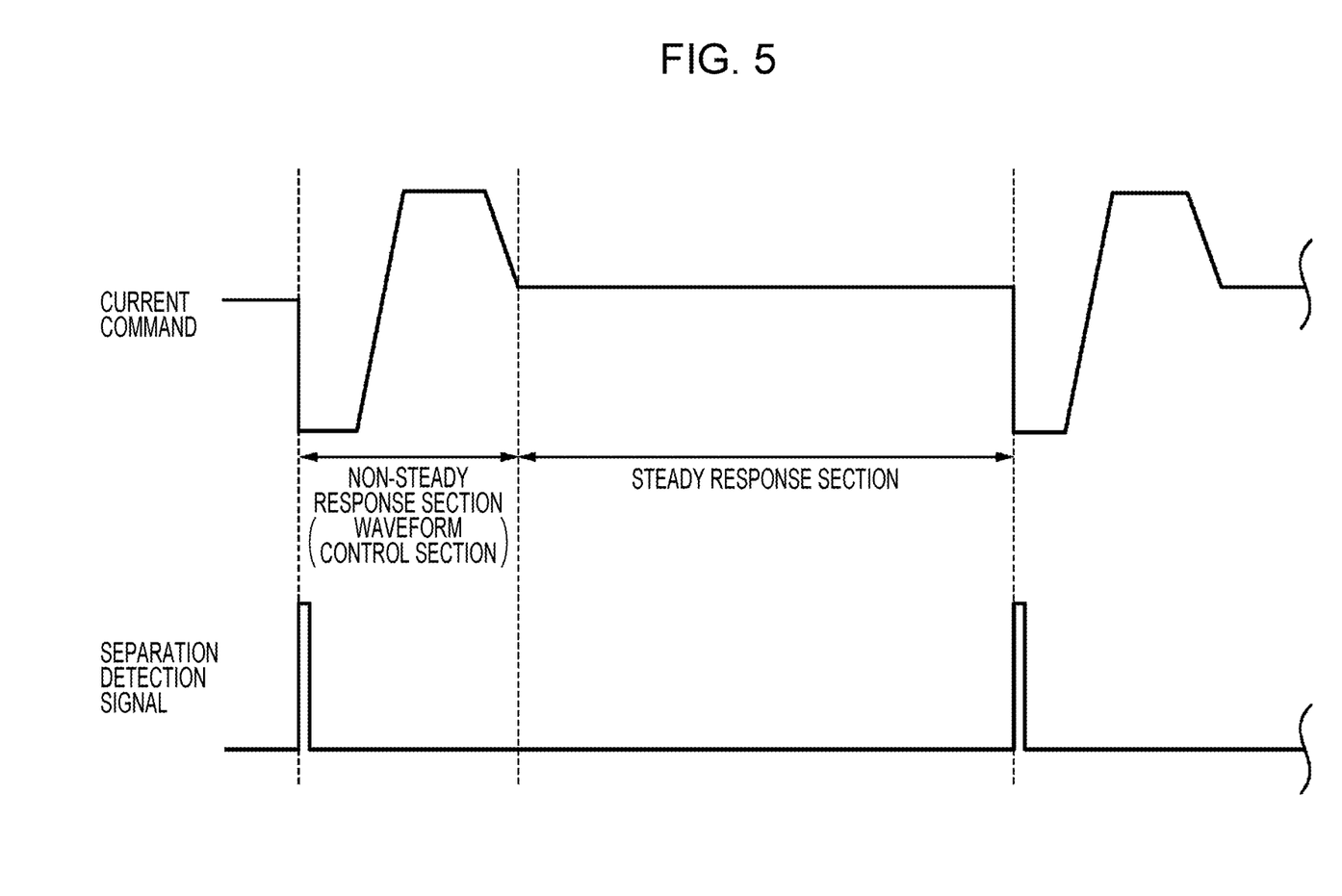
FIG. 5 is a graph illustrating a transition to a non-steady response section in response to a separation detection signal and a relationship with a steady response section.
Figure 6:
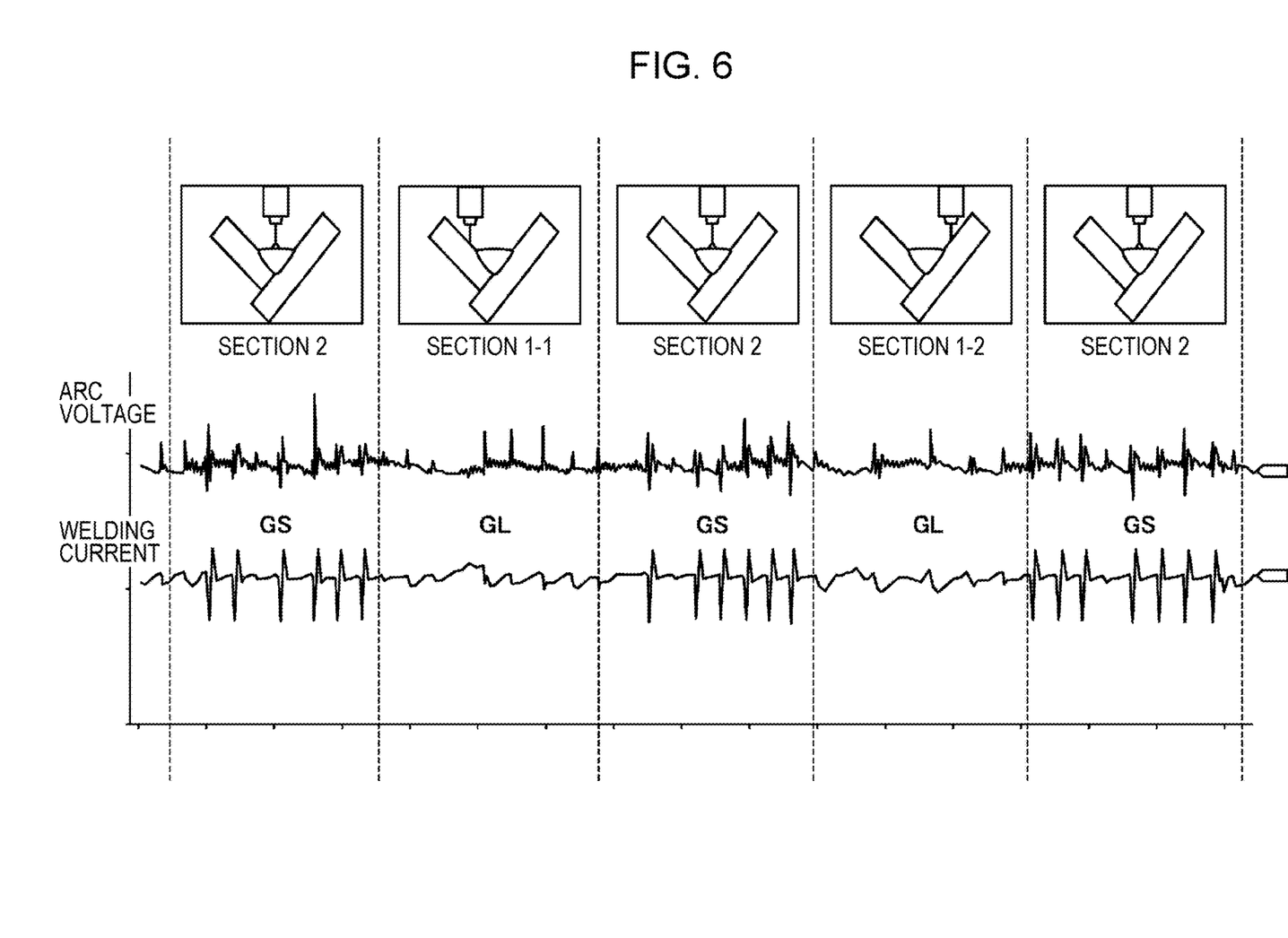
FIG. 6 illustrates an arc property gain according to the tip-to-work distance and waveforms of an arc voltage and a welding current.

A specific example where waveform control is performed in a specific section of the welding current in response to a separation detection signal as a trigger will now be described based on FIGS. 5 to 7. As shown in FIG. 5, when a separation detection signal is detected, the welding current transitions to a non-steady response section, that is, a waveform control section, in response to the detection as a trigger. After a Predetermined period, the waveform control is completed, and the welding current returns to a steady response section. When the torch position changes during weaving, this control preferably involves performing separation detection at a position, that is, in the section 2, where the tip-to-work distance at the torch position increases, as shown in FIG. 6, and not performing the separation detection at positions including a toe position, namely, the section 1-1 and the section 1-2.

Figure 7:
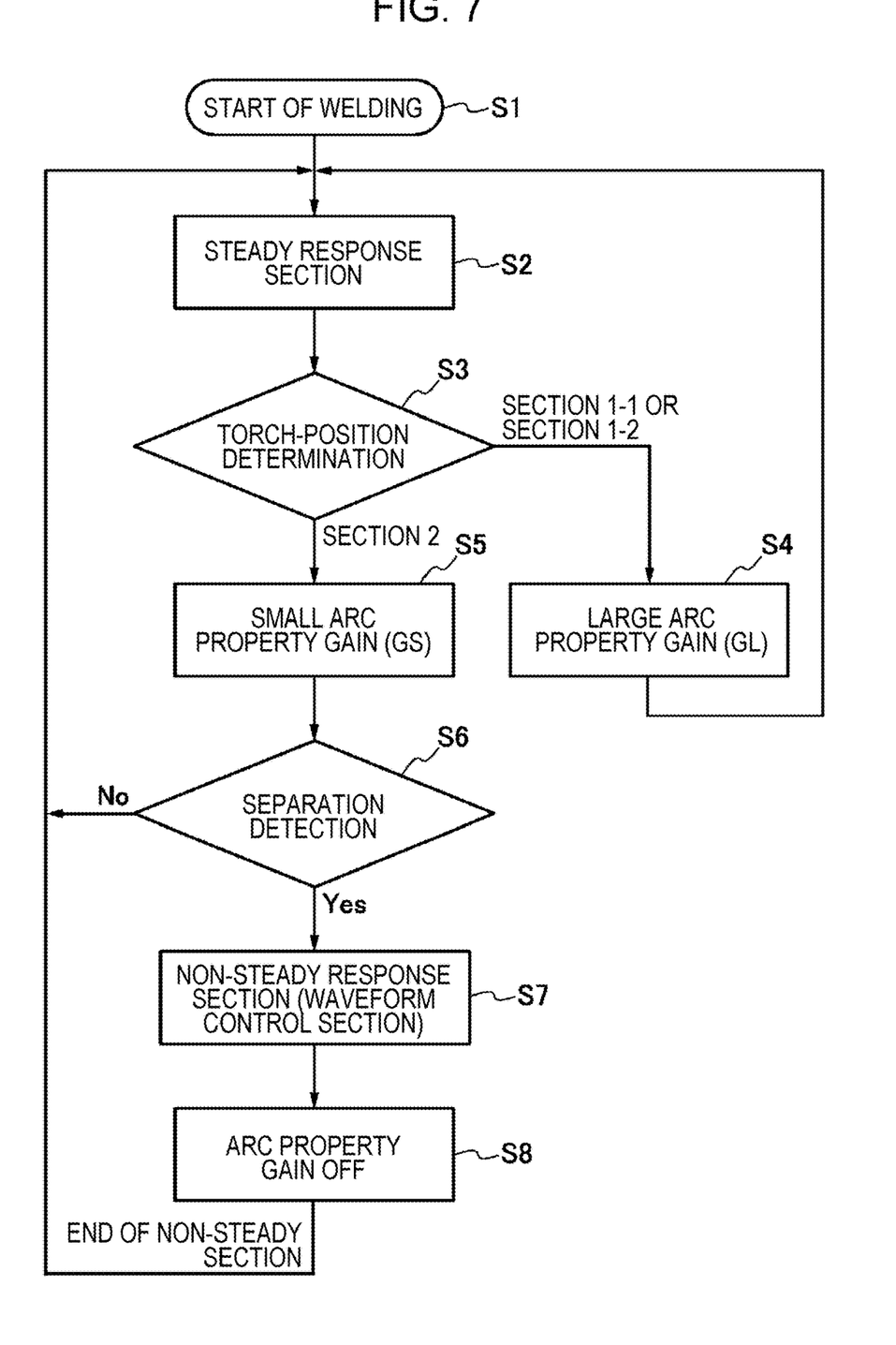
FIG. 7 is a flowchart illustrating a procedure for welding control in a steady response section and a non-steady response section.

In detail, as shown in FIG. 7, after starting a welding process (step S1), if the welding current is in a steady response section (step S2), it is determined whether the section is the section 2 or whether the section is the section 1-1 or the section 1-2 in accordance with torch-position determination (step S3). If the determination result indicates that the section is the section 1-1 or the section 1-2, control is performed to set the arc property gain G to the large arc property gain GL (step S4). If the determination result indicates that the section is the section 2, control is performed to set the arc property gain G to the small arc property gain GS (step S5). After determining that the section is the section 2 and the arc property gain G is controlled to the small arc property gain GS, if a separation detection signal is detected (step S6), a transition is made to a non-steady response section, that is, a waveform control section (step S7). Moreover, the arc property gain G is set to an off mode (step S8). In this case, "arc property gain OFF" refers to a state where the correction current Ierr is not input. Upon completion of the waveform control section set in advance, the welding current returns to the steady response section, and the arc property gain G is controlled based on the torch position.

Accordingly, in the case where the welding current has a non-steady response section and a steady response section, it is preferable that a correction current be calculated in the steady response section in accordance with the output control method described above in this embodiment. Consequently, in the welding process performed in the steady response section, fluctuations in the welding current are suppressed while the arc length control is maintained, thereby obtaining favorable welding workability and achieving more accurate arc tracking.

Furthermore, the aforementioned non-steady response section is preferably a waveform control section of the welding current. Accordingly, more favorable welding workability can be obtained.

Moreover, the non-steady response section is preferably a transient response section of the welding current. Accordingly, more favorable welding workability can be obtained.

[Test Result for Comparison]

Figure 8:
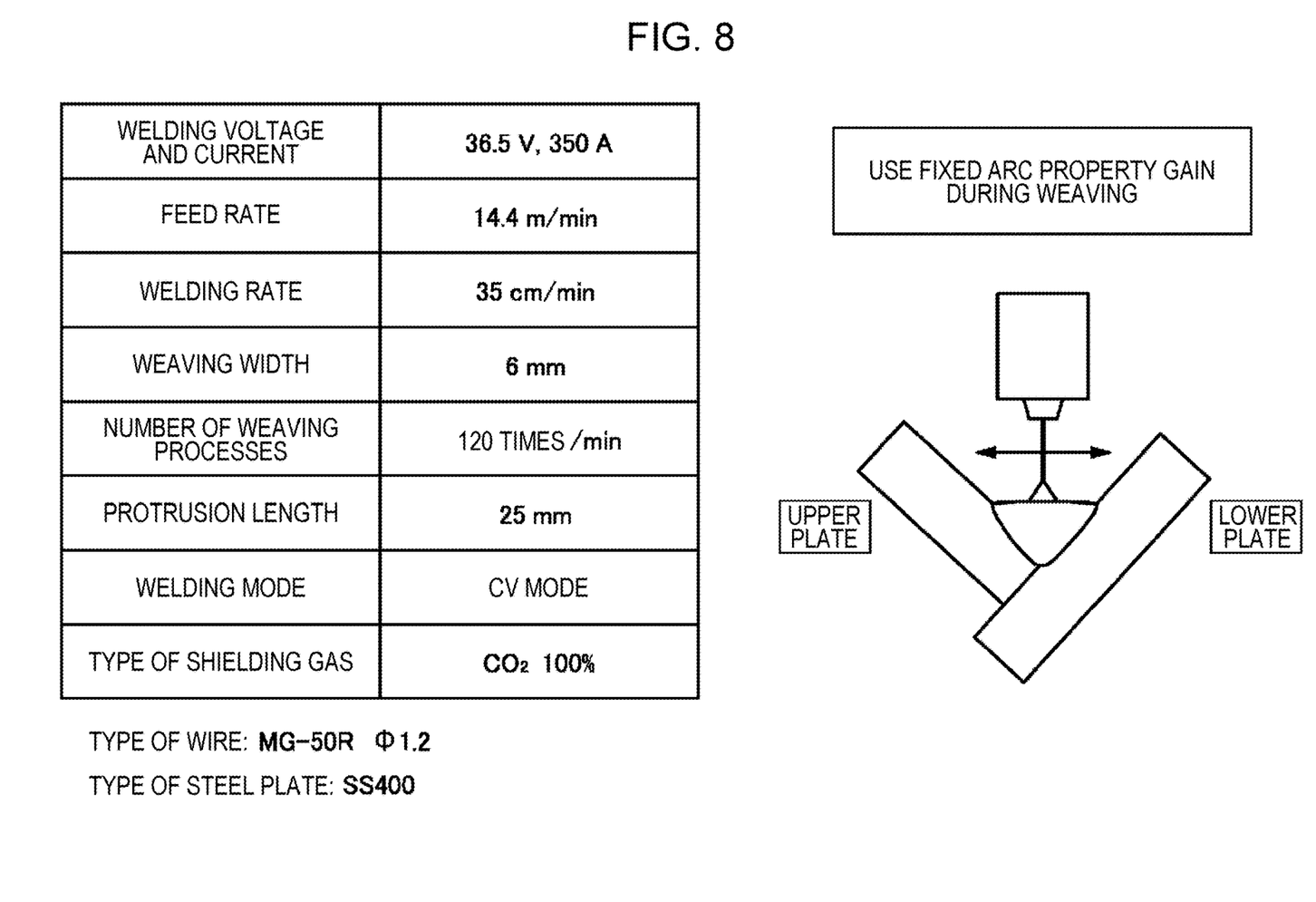
FIG. 8 illustrates a test result for a comparison in a case where weaving-welding is performed in a welding condition where the arc property gain is fixed.
Figure 9:
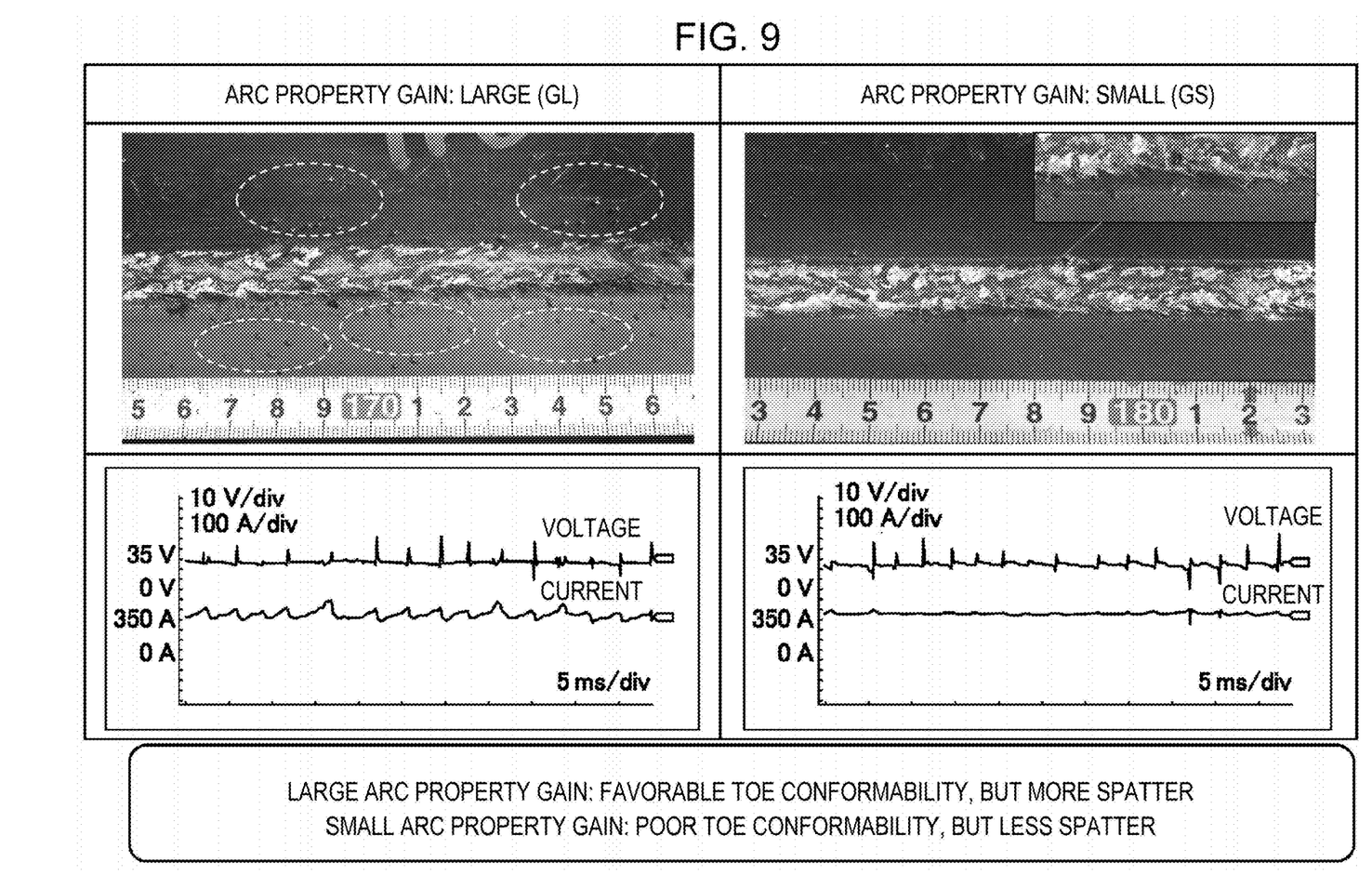
FIG. 9 illustrates changes in the voltage waveform and the current waveform caused by a difference in the arc property gain, as well as the state of a welded area, in the weaving-welding shown in FIG. 8 in which the arc property gain is fixed.

In order to examine the effects on the bead appearance and the number of occurrences of spatter in accordance with a difference in the arc property gain G, welding is performed on a T-joint by downward fillet welding under welding conditions shown in FIG. 8 in a state where the arc property gain is fixed. Specifically, weaving-welding is performed in a state where the arc property gain is fixed over the entire weaving width W. FIG. 9 illustrates changes in the voltage waveform and the current waveform caused by a difference in the arc property gain, as well as the state of a welded area, in the weaving-welding performed with the fixed arc property gain.

As shown in FIG. 9, when the arc property gain is fixed to the large arc property gain GL, fluctuations are observed in the current waveform, and the arc length control stabilizes. This enables favorable toe conformability, but results in an increased number of occurrences of spatter. When the arc property gain is fixed to the small arc property gain GS, the current waveform stabilizes. This is problematic in terms of toe conformability, but results in a reduced number of occurrences of spatter.

Although the above description relates to an example where welding is performed on a T-joint by weaving as an example of gas-shielded arc welding in which the tip-to-work distance changes, the present invention is not limited to this example so long as it is applied to welding in which the tip-to-work distance changes.

Furthermore, the present invention is not limited to the above-described embodiment, and may be modified or altered, where appropriate.

Although various embodiments have been described above with reference to the drawings, the present invention is not limited to these examples. It is apparent that a skilled person may conceive of various modifications and corrections within the scope defined in the claims, and it is to be understood that such modifications and corrections belong to the technical scope of the present invention. The components in the above embodiment may be freely combined so long as they do not deviate from the scope of the invention.

The present application is based on Japanese Patent Application (2020-012535) filed on Jan. 29, 2020, the contents of which are hereby incorporated by reference.

REFERENCE SIGNS LIST 50 arc welding system
100 welding robot
200 welding torch
400 welding power source
440 correction-amount calculation circuit (correction-current calculating means)
460 correction current calculator (correction-current calculating means)
600 welding control device

610 torch position detector (torch-position determining means)
Dv1 instantaneous-voltage error signal (instantaneous-voltage error value)
Dv2 average-voltage error signal (average-voltage error signal)
G1 arc property gain (first gain)
G2 arc property gain (second gain)
Ierr correction current
Va instantaneous-output-voltage setting signal (instantaneous-output-voltage setting value)
Vave average-output-voltage detection signal (average-output-voltage detection value)
Vd welding-voltage detection signal (output-voltage detection value)
Vs output-voltage setting signal (output-voltage setting value)
W weaving width
section 1-1, section 1-2 weaving end sections
section 2 central section

The invention claimed is:

1. An output control method for performing gas-shielded arc welding in which a tip-to-work distance changes during the welding, the gas-shielded arc welding being performed by using a welding system having a welding control device and a welding power source,
wherein at least one of the welding control device and the welding power source has a torch position detector to determine a welding torch position during the welding,
wherein the welding power source has a correction-amount calculation circuit to calculate a correction current for feedback control,
wherein the correction-amount calculation circuit includes at least one of
a first controlling expression in which an instantaneous-voltage error value Dv1 serving as a difference between an instantaneous-output-voltage setting value Va and an output-voltage detection value Vd is multiplied by a first gain G1, and
a second controlling expression in which an average-voltage error value Dv2 serving as a difference between an output-voltage setting value Vs and an average-output-voltage detection value Vave in a preset period is multiplied by a second gain G2, and
wherein the output control method comprises:
setting at least one of the first gain G1 and the second gain G2 based on a torch-position detection value determined by the torch position detector; and
calculating the correction current based on at least one of the first controlling expression and the second controlling expression.

2. The output control method for gas-shielded arc welding according to claim 1, further comprising performing control to increase at least one of the first gain G1 and the second gain G2 if the torch position detector detects the torch-position detection value based on which the tip-to-work distance is determined to be within a predetermined distance.

3. The output control method for gas-shielded arc welding according to claim 1,
wherein the gas-shielded arc welding in which the tip-to-work distance changes is weaving-welding,
wherein three or more preliminarily-segmented torch position sections are set within a range in which a welding torch performs weaving, and
wherein the torch position detector determines that a torch position has changed when the welding torch enters each of the torch position sections during the weaving, and outputs the torch-position detection value.

4. The output control method for gas-shielded arc welding according to claim 3,
wherein the torch position sections include at least two independently-set sections including a central section and a weaving end section, the central section including a position where the tip-to-work distance is the largest, the weaving end section including an end of the weaving.

5. The output control method for gas-shielded arc welding according to claim 4, wherein at least one of the first gain G1 and the second gain G2 when the welding torch is positioned in the weaving end section is controlled to be higher than at least one of the first gain G1 and the second gain G2 when the welding torch is positioned in the central section.

6. The output control method for gas-shielded arc welding according to claim 4,
wherein the weaving end section has a width of 20% to 80% of half a distance of a weaving width by which the welding torch performs the weaving.

7. The output control method for gas-shielded arc welding according to claim 3,
wherein if at least one of the first gain G1 and the second gain G2 is to be controlled for each of the torch position sections, the output control method further comprises:
starting to increase or decrease the at least one of the first gain G1 and the second gain G2 at a boundary or near the boundary of each torch position section; and
setting an increasing-decreasing rate of the at least one of the first gain G1 and the second gain G2 between $0.05/\mu s$ and $0.10/\mu s$.

8. An output control method for gas-shielded arc welding in which a welding current has a non-steady response section and a steady response section, the output control method comprising:
using the output control method according to claim 1 to calculate the correction current in the steady response section.

9. The output control method for gas-shielded arc welding according to claim 8, wherein the non-steady response section is a waveform control section of the welding current.

10. The output control method for gas-shielded arc welding according to claim 8, wherein the non-steady response section is a transient response section of the welding current.

11. A welding system comprising:
a welding control device and a welding power source and for performing gas-shielded arc welding in which a tip-to-work distance changes during the welding,
wherein at least one of the welding control device and the welding power source has a torch position detector to determine a welding torch position during the welding,
wherein the welding power source has a correction-amount calculation circuit to calculate a correction current for feedback control,
wherein the correction-amount calculation circuit includes at least one of
a first controlling expression in which an instantaneous-voltage error value Dv1 serving as a difference between an instantaneous-output-voltage setting value Va and an output-voltage detection value Vd is multiplied by a first gain G1, and
a second controlling expression in which an average-voltage error value Dv2 serving as a difference between an output-voltage setting value Vs and an average-output-voltage detection value Vave in a preset period is multiplied by a second gain G2, wherein the correction-amount calculation circuit sets at least one of the first gain G1 and the second gain G2 based on a torch-position detection value determined by the torch position detector, and wherein the correction-amount calculation circuit calculates the correction current based on at least one of the first controlling expression and the second controlling expression.

12. A welding power source for performing gas-shielded arc welding in which a tip-to-work distance changes during the welding, the welding power source comprising:
   a torch position detector to determine a welding torch position during the welding; and
   a correction-amount calculation circuit to calculate a correction current for feedback control,
   wherein the correction-amount calculation circuit includes at least one of
   a first controlling expression in which an instantaneous-voltage error value Dv1 serving as a difference between an instantaneous-output-voltage setting value Va and an output-voltage detection value Vd is multiplied by a first gain G1, and
   a second controlling expression in which an average-voltage error value Dv2 serving as a difference between an output-voltage setting value Vs and an average-output-voltage detection value Vave in a preset period is multiplied by a second gain G2, wherein the correction-amount calculation circuit sets at least one of the first gain G1 and the second gain G2 based on a torch-position detection value determined by the torch position detector, and wherein the correction-amount calculation circuit calculates the correction current based on at least one of the first controlling expression and the second controlling expression.

* * * * *